H. F. OSBORNE.
Leather-Rounding Machine.
No. 162,762. Patented May 4, 1875.
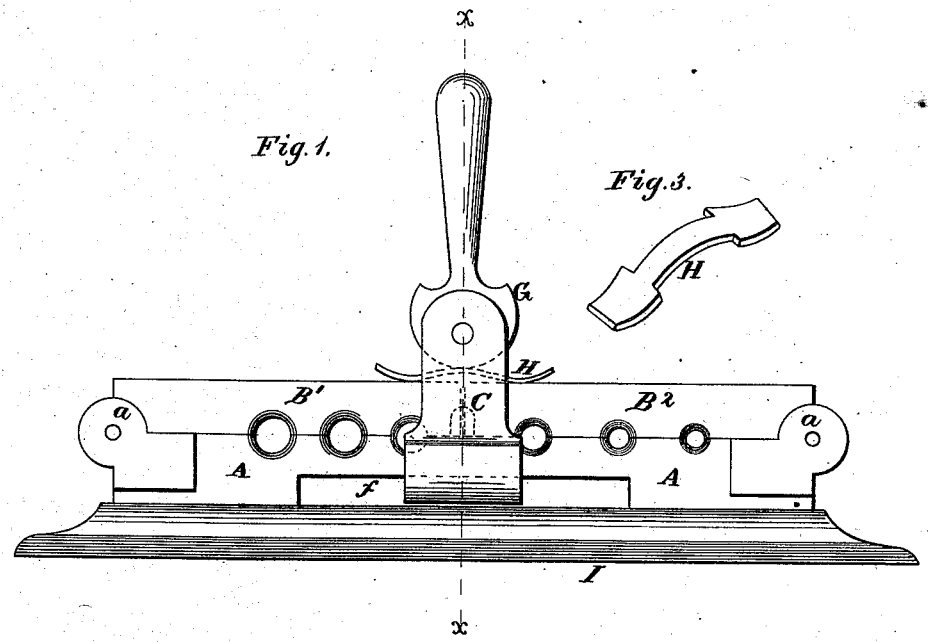
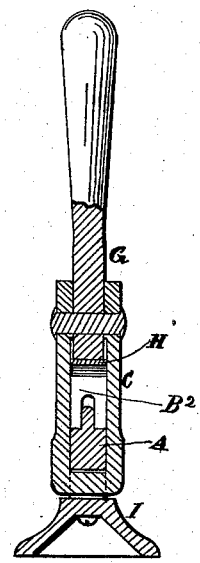

UNITED STATES PATENT OFFICE.

HENRY F. OSBORNE, OF NEWARK, NEW JERSEY.

IMPROVEMENT IN LEATHER-ROUNDING MACHINES.

Specification forming part of Letters Patent No. 162,762, dated May 4, 1875; application filed July 9, 1874.

*To all whom it may concern:*

Be it known that I, HENRY F. OSBORNE, of Newark, county of Essex and State of New Jersey, have invented certain new and useful Improvements in Machines for Rounding Leather, of which the following is a specification:

My present invention is intended as an improvement upon the machine for rounding leather, for which Letters Patent No. 150,704 were granted to me May 12, 1874; and it consists in the application of a spring between the cam and the upper bars.

In order to enable others skilled in the art to which my invention appertains to make and use the same, I will now proceed to describe its construction and operation, referring to the annexed drawing, in which—

Figure 1 is a side elevation of my leather-rounding machine, and Fig. 2 is a transverse vertical section of the same through the line $x\,x$, Fig. 1. Fig. 3 is a perspective view of the spring.

A represents the lower bar, provided with a slot, $f$, in its lower edge. $B^1\,B^2$ are the upper bars having their outer ends hinged to the ends of the bar A by rule-joints $a\,a$, and their inner ends meeting at the center of the lower bar. The bars have the rounding holes formed in them in the usual way. C is a sliding carriage or clip, made of one piece open at the upper end, and the closed lower end sliding in the slot $f$ of the under bar A. Between the upper ends of the clip C the cam G is pivoted.

These parts are all constructed substantially in the same manner as described in my formed patent above referred to, except that the clip is made of one piece.

H is a spring placed between the cam and the upper surface of the bars $B^1\,B^2$ to give a firm pressure upon the leather, yielding only where there is an unevenness in the leather, which would prevent its passing through if the parts were rigidly held together. I represents a base to the machine, which is made separate and secured to the lower bar A by screws or rivets after the clip is placed in its place, which can only be done by passing the clip over the end of the machine while one of the upper bars is open.

The advantages of the spring can all be obtained by the use of a weight with a sliding arrangement, which would raise when the pressure between the parts of the rounder forces them apart.

Having thus fully described my invention, what I claim as new, and desire to secure by Letters Patent, is—

The combination of a spring, with a sliding carriage or clip and bars of a rounding-machine, substantially as shown and described.

In testimony that I claim the foregoing as my invention I hereunto affix my signature this 2d day of July, 1874.

HENRY F. OSBORNE.

Witnesses:
A. H. WARD,
T. M. WARD.